United States Patent
Lake

[11] 3,719,529
[45] March 6, 1973

[54] VOLTAIC CELL AND METHOD USING DILUTE FUEL GASES FOR GENERATE ELECTRICAL POWER

[75] Inventor: David P. Lake, Sterling Heights, Mich.

[73] Assignee: General Motors Corporation, Detroit, Mich.

[22] Filed: Sept. 30, 1971

[21] Appl. No.: 185,220

[52] U.S. Cl.............136/86 R, 136/86 D, 136/86 E
[51] Int. Cl..............................................H01m 27/30
[58] Field of Search..........................................136/86

[56] References Cited

UNITED STATES PATENTS

| 3,350,227 | 10/1967 | Moerikofer | 136/86 E |
| 3,360,401 | 12/1967 | Grosselli et al. | 136/86 E |
| 3,368,927 | 2/1968 | Worsham | 136/86 E X |

FOREIGN PATENTS OR APPLICATIONS

| 231,018 | 0/1892 | Great Britain | 136/86 R |

Primary Examiner—Allen B. Curtis
Attorney—William S. Pettigrew et al.

[57] ABSTRACT

A voltaic cell operating on oxidizing gaseous mixtures containing a dilute fuel gas. Functionally similar catalytic gas electrodes are used with a phosphoric acid electrolyte and an ion exchange resin gas diffusion barrier in between. The electrodes are saturated with electrolyte. Means are provided to reduce current variation due to water content variation in the phosphoric acid. The cell can operate on fuel gas mixtures of air containing low concentrations of carbon monoxide.

6 Claims, 1 Drawing Figure

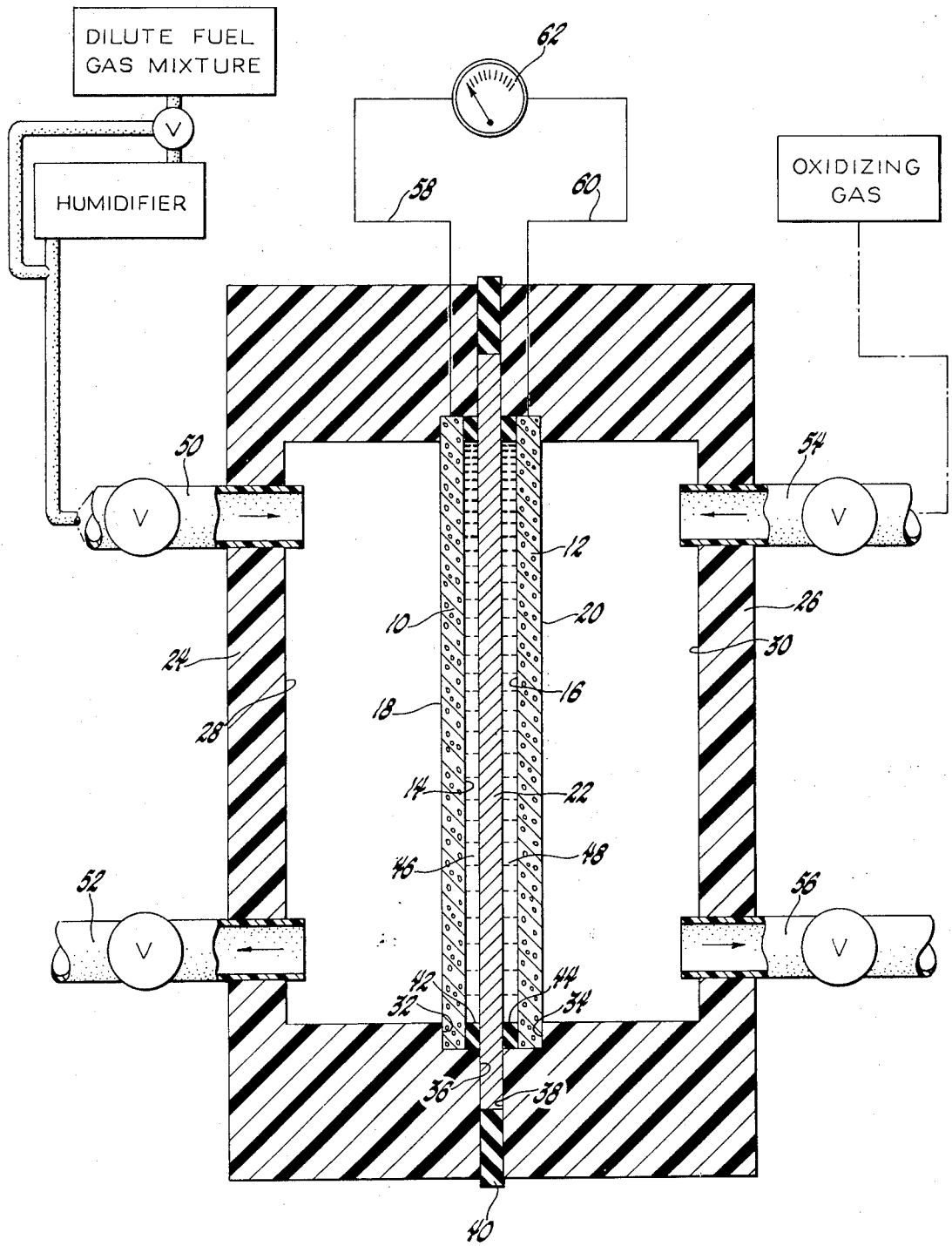

VOLTAIC CELL AND METHOD USING DILUTE FUEL GASES FOR GENERATE ELECTRICAL POWER

BACKGROUND OF THE INVENTION

This invention relates to galvanic cells and more particularly to a voltaic cell which generates electrical power by oxidation of a gaseous fuel.

Considerable work has been done to develop voltaic cells that produce a high electrical power output from electrochemical oxidation of a fuel gas. However, these cells are designed to operate with, and frequently require, highly concentrated or substantially pure reducing gases, called fuel gases. I have developed a voltaic cell which will reliably generate electrical power for extended periods on oxidizing atmospheres containing only a very small fuel gas concentration. The rate of power output for this cell is small. On the other hand, this cell will function predictably and reliably on such gaseous mixtures, while conventional fuel cells will not.

In addition, this cell generates current at a rate which is a direct function of the concentration of the fuel gas present in the fuel gas mixture. Hence, its rate of power output can be readily controlled by regulating the fuel gas concentration, or its power output can be used to monitor the fuel gas concentration in the mixture.

OBJECTS AND SUMMARY OF THE INVENTION

It is, therefore, an object of this invention to provide a voltaic cell that reliably operates on dilute fuel gases in an oxidizing atmosphere, particularly air. It is also an object of this invention to provide a voltaic cell in which the cell current output is a precisely predictable direct function of a minor fuel gas concentration in a mixture containing relatively large amounts of oxygen. A further object of this invention is to provide a method for using such a cell.

These and other objects of the invention are attained with a voltaic cell having a pair of substantially identically catalyzed and constructed gas electrodes wetted with a strongly hygroscopic electrolyte, and an ion exchange membrane gas diffusion barrier therebetween. The electrodes are not only wetted but maintained substantially completely flooded with electrolyte.

BRIEF DESCRIPTION OF THE DRAWING

The foregoing objects, as well as other objects, features and advantages of the invention will become more apparent from the following description of preferred examples thereof and from the drawing which schematically shows a cross-sectional view of a voltaic cell constructed in accordance with this invention.

DESCRIPTION OF THE PREFERRED EMBODIMENTS

As can be seen by referring to the drawing, the voltaic cell of this invention includes two spaced circular gas electrodes 10 and 12 having generally parallel facing surfaces 14 and 16, and backside surfaces 18 and 20, respectively. A somewhat larger circular ion exchange membrane 22 is disposed between and spaced from electrodes 10 and 12, generally parallel therewith.

The cell also includes cup-shaped housing members 24 and 26, which provide circular gas supply chambers 28 and 30 contiguous the backside surfaces 18 and 20 of the electrodes. The edge of electrode backside 18 is seated throughout its circumference on an annular shoulder 32 on the inner lip of cup-shaped member 24. Backside 20 of electrode 12 is similarly seated on an annular shoulder 34 of cup-shaped member 26.

Ion exchange member 22 is compressed between the facing surfaces 36 and 38 of cup-shaped members 24 and 26 along with a surrounding annular rubber seal 40. Smaller annular rubber gaskets 42 and 44 are compressed between the electrodes and the ion exchange member 22 in register with shoulders 32 and 34, to provide sealed electrolyte chambers 46 and 48. Chambers 46 and 48 are filled with concentrated phosphoric acid which is at least 85%, by weight, $H_3PO_4$ (61.5% $P_2O_5$). The acid contains about 0.05 percent, by volume, of a wetting agent. Polyethoxylated aliphatic, phenyl or naphthyl hydroxy compounds, such as polyethoxylated p-octylphenol, can be used. Also, one can use surfactants that are sodium salts of sulfonated perfluoro [p-($C_nH_{2n+2}$) benzene], where $n$ may be 3 – 8. If desired, means (not shown) can be provided to conveniently fill chambers 46 and 48 after assembly of the cell. Any convenient means such as insulated clamps, tie bolts, etc., (not shown) can be used to lock the assembly together. I have described electrolyte chambers 46 and 48 adjacent membrane 22. However, distinct electrolyte chambers are not necessary to this invention. If desired, electrolyte saturated electrodes can be placed directly on contact with membrane 22, to reduce electrolyte resistance.

Gas supply chamber 28 has an inlet conduit 50 and an outlet conduit 52, each of which has an associated shut-off valve. Similarly, chamber 30 has an inlet conduit 54 and an outlet conduit 56, with each conduit having its own shut-off valve. Leads 58 and 60 are provided for electrodes 10 and 12, respectively, to facilitate connection of a microammeter 62.

Since the cell is functionally symmetrical, either side of it can be used as the oxidizing or reducing half cell. For purposes of illustration, one can consider chamber 28 as the fuel gas chamber and chamber 30 as the oxidant chamber. Conduit 50 accordingly is connected to a dilute fuel gas mixture source and conduit 54 to a source of oxidizing gas. Pure air can be used as the oxidizing gas for a fuel gas mixture of carbon monoxide in air. Since the rate of oxygen consumption is relatively low, chamber 30 can be flushed with the oxidizing gas, air, and then sealed by closing the valves on conduits 54 and 56. The chamber is preferably filled only to atmospheric pressure. The cell will function for a lengthy period on the stored oxygen. The fuel gas mixture could be similarly stored in chamber 28. However, this cell is intended to operate on extremely dilute fuel gas mixtures, at substantially atmospheric pressure. This permits one to store only a small amount of fuel in the cell itself. Hence, it is preferred to expose backside 18 of electrode 10 to a continuous supply of the dilute fuel gas mixture. However, in using a continuous supply of fuel gas, one must consider the effect of the fuel gas mixture relative humidity on the cell electrolyte, as will subsequently be described.

Fuel cells generally have functionally different anodes and cathodes, with each being distinctly made to enhance their oxidation or reduction characteristics with selected oxidizing or reducing gases. Such is not the case in this cell. Both electrodes are functionally the same. They are substantially identically catalyzed and constructed. Other than this the precise nature of the electrode is not critical, and any of the conventional fuel or oxidant gas electrode materials can be used. However, a fuel electrode material is preferred for the electrodes in this cell.

A further distinction from conventional fuel cells is that this cell is operated with both electrodes substantially completely saturated, flooded, with cell electrolyte. Hence, the electrolyte must thoroughly wet the electrodes, as well as be compatible with the electrochemical reaction. Nonwetproofed electrode materials can be used, although I have obtained highly satisfactory results with conventional wetproofed fuel electrode materials when using concentrated phosphoric acid as the electrolyte. A wetting agent can be included in the electrolyte, if desired, to insure thorough electrolyte saturation of the electrodes. Under some conditions it even reduces cell current variation due to changes in relative humidity of the fuel gas mixture. The wetting agent can be included directly in the electrolyte or provided in other ways, for example as a coating placed on the electrodes before cell assembly. Only small but effective amounts are needed, as for example about 0.02 percent – 0.05 percent, by volume. However, in some instances one may prefer to use up to 0.1 percent.

As I have previously indicated the relative humidity of a fuel gas mixture continuously passed through the cell can have a significant affect on cell current. The water in most aqueous electrolytes can be evaporated through the fuel electrode face, reducing cell output as the water is lost. With reduced cell output, cell sensitivity to fuel gas variation is reduced. Moreover, relative humidity changes in a fuel gas mixture flow can obscure changes in fuel gas concentration, if not compensated.

By saturating the fuel gas mixtures completely with water one can eliminate sensitivity variation due to humidity variation. However, less moist, e.g. 50 percent – 75 percent relative humidity, fuel gases will produce a decline in cell sensitivity, as the electrolyte drys out or adjusts to the less moist atmosphere.

It appears that relative humidity of continuously flowed fuel gas mixtures may affect electrode flooding and/or electrolyte conductivity. However, this has not been confirmed. In any event, I have found that use of moist, greater than 85 percent relative humidity, fuel gas mixtures insures maximum cell output, especially if a wetting agent is included in the electrolyte. The use of the wetting agent improves the cell by making it less sensitive to relative humidity change. This is of particular interest when using less moist fuel gas mixtures. Thus, the electrolyte for this cell must not only be compatible with the electrochemical reaction occurring but must also be resistant to drying out if it is to be operated for long periods. I have found that highly satisfactory results on various fuels can be obtained with concentrated phosphoric acid as the electrolyte. It readily wets commercially available gas electrode materials, even those that are wetproofed. Moreover, it is compatible with the reaction products of many fuels. Precipitates do not form in it to contaminate the electrolyte or interfere with effective electrode operation. I prefer to employ phosphoric acid in concentrations of 85% – 100%, by weight, $H_3PO_4$ (61.5% – 72.4%, by weight, $P_2O_5$). On the other hand, satisfactory results can be obtained with phosphoric acid concentrations as low as 50%, by weight, $H_3PO_4$ (36.2%, by weight, $P_2O_5$).

Phosphoric acid is so strongly hygroscopic that it does not completely dry out even after extended exposure to low relative humidity fuel gas mixtures. It merely adjusts, and fairly quickly so, to a new water content equilibrium with each change in relative humidity of the fuel gas mixture it is exposed to. Once this equilibrium condition has been achieved, the phosphoric acid will not appreciably lose any more water even after long exposure to gas flow at the equilibrium relative humidity. Thus, the electrode appears to remain flooded with electrolyte regardless of the gas flow relative humidity. On the other hand, with each reduction in water content, there is an attendant loss in cell output, or sensitivity. However, as the water content stabilizes, so does cell sensitivity, but at a lower level. Conversely, sensitivity can be increased by simply increasing the relative humidity of the gas flow.

It can also be increased by simply adding a wetting agent to the phosphoric acid. Then, one can obtain substantially the same sensitivity with less moist gases, relative humidities of 50 percent – 75 percent, that is obtained with high relative humidity gases. In essence, the wetting agent reduces sensitivity variation due to humidity changes in the fuel gas. Relative humidity can be varied over even wider ranges with only nominal changes in cell sensitivity. A constant relative humidity source is, therefore, not needed to avoid sensitivity variation.

A further complicating factor in this cell is that the fuel gas mixture can diffuse through its electrode without undergoing electrochemical reaction. This, of course, would reduce cell output by allowing some fuel to reach the counterelectrode. For this reason, a gas diffusion barrier must be provided. I have found that a cationic exchange membrane in the acid form placed between the electrodes serves this purpose quite well, particularly in combination with a phosphoric acid electrolyte. An ion exchange membrane such as du-Pont X-R, which is perfluorosulfonic acid, can be used. Ion exchange membranes such as these must be kept moist to provide satisfactory ionic conduction between the two electrolyte chambers. However, if there is enough water in the electrolyte to keep the electrodes flooded there will be enough to keep the ion exchange membrane moist too. Moreover, these membranes should be used at temperatures below about 100° C. to insure against degradation under long-term operation.

It has been mentioned that this cell operates on dilute fuel gas mixtures which are actually oxidizing in character, for example, air containing a small percent of carbon monoxide, smoke and/or hydrocarbon vapors. For maximum sensitivity, the oxidant gas for this cell is preferably the diluent atmosphere for the fuel gas mixture. Thus, if the fuel gas mixture is carbon monoxide in air, the air minus the carbon monoxide is preferred in the oxidizing gas. Thus, pure oxidizing gases, e.g. pure oxygen, are not necessary. On the other hand, the oxidant gas can contain some fuel gases in it too, but at the expense of cell output. Hence, an oxidizing atmosphere is used at each electrode of this cell but it contains a greater fuel gas concentration at one electrode than at the other. Fuel gas concentration is, of course, greater when there is no fuel gases at all in the oxidizing atmosphere at the other electrode. Conversely, the other electrode should have a lesser fuel gas concentration, including no fuel gas at all.

This cell exhibits a fairly quick response to changes in fuel gas concentration at room temperature. Increasing cell temperature decreases the cell response time. However, it also accentuates the aforementioned effects of fuel gas relative humidity on cell sensitivity. However, if a fuel gas with a high relative humidity is used, the water content of the electrolyte is maintained at a high value, even at cell temperatures as high as 110° C. with a phosphoric acid electrolyte. If desired, the cell can be heated by the incoming fuel gas mixture rather than by providing a special cell heater.

Since current output of this cell is a direct function of fuel gas concentration, this cell can be used to monitor fuel gas concentration. This cell has consistently operated with reproducible results on fuel gas mixtures of air containing carbon monoxide concentrations as low at 25 parts per million and as high as 10,000 parts per million. Test results indicate these same results should be available with even lower fuel gas concentrations, e.g. 1 part per million or higher fuel gas concentrations, e.g. 60,000 parts per million. Accordingly, it could be used to precisely monitor carbon monoxide concentration in dilute carbon monoxide distribution system flow lines, if other fuel gases are not present or are present in a low constant percentage. One could monitor carbon monoxide concentrations in a known or controlled humidity ambient atmosphere if other fuel gases are not present. Ambient atmosphere could be pumped through chamber 28, or the back wall on chamber 28 could be removed to expose electrode 10 to the ambient atmosphere. In addition, this cell has been used to detect fuel gas concentrations in the exhaust stream of an automobile internal combustion engine. In this latter connection, a high stable cell sensitivity can be obtained even without adding a wetting agent to the phosphoric acid electrolyte. An engine exhaust gas stream has a high water content. However, it must be cooled to a temperature of less than about 110° C. to be useful in the cell described here. When so cooled, the stream has a substantially constant high relative humidity. Thus, as previously indicated, cell sensitivity is stabilized at a high level.

I claim:

1. An electrochemical system for generating microwatts of electrical power on dilute fuel gases in oxidizing atmospheres, comprising:
    at least two substantially identically catalyzed and constructed spaced gas electrodes, said electrodes having facing and opposite surfaces,
    a hydrogen ion exchange gas diffusion barrier between said facing electrode surfaces inhibiting gas diffusion from one electrode to the other,
    concentrated phosphoric acid saturating said electrodes and wetting said ion exchange diffusion barrier to provide ionic conduction paths therebetween,
    a source of an oxidizing gas containing a dilute fuel gas in communication with the opposite face of one of said electrodes,
    a source of an oxidizing gas having a lesser fuel gas concentration in communication with the opposite face of the other electrode,
    means for drawing electrical current between said electrodes, and
    means for suppressing current variation between said electrodes due to variation in water content in said phosphoric acid.

2. A voltaic cell for generating microwatts of electrical power on oxidizing atmospheres containing very dilute fuel gas mixtures comprising:
    at least two substantially identically catalyzed and constructed spaced gas electrodes, said electrodes having facing and opposite surfaces,
    a cationic exchange membrane in the acid form between said facing surfaces for inhibiting gas diffusion between said electrodes,
    phosphoric acid containing at least about 50%, by weight, $H_3PO_4$ saturating said electrodes and wetting said ion exchange membrane,
    up to about 0.1 percent, by volume of a wetting agent in said electrolyte to minimize dependence of cell output on relative humidity of cell gases,
    means for supplying an oxidizing atmosphere containing carbon monoxide to the opposite surface of one electrode, and
    means for supplying said oxidizing atmosphere with a lesser carbon monoxide content to the opposite surface of the other electrode.

3. A voltaic cell for generating microwatts of electrical power on air containing small amounts of carbon monoxide comprising:
    at least two substantially identically catalyzed and constructed spaced gas electrodes, said electrodes having facing and opposite surfaces,
    a cationic exchange membrane of the perfluorosulfonic acid type in the acid form between said facing surfaces preventing gas diffusion between said electrodes,
    phosphoric acid containing at least about 85% $H_3PO_4$ substantially completely saturating said electrodes and wetting said ion exchange membrane,
    a first source of air having a generally constant high relative humidity and containing varying minor amounts of carbon monoxide at temperatures up to about 110° C.,
    a second source of air having less carbon monoxide than said first source,
    one of said sources of air in communication with the opposite surface of one of said electrodes, and
    the other of said sources of air in communication with the opposite surface of the other electrode.

4. An integrated system for generating microwatts of electrical power on internal combustion engine exhaust gases comprising:
    substantially identically catalyzed and constructed spaced gas electrodes, said electrodes having facing and opposite surfaces,
    a hydrogen ion exchange membrane of the perfluorosulfonic acid type between said facing surfaces preventing gas diffusion from one electrode to the other, concentrated phosphoric acid flooding said electrodes and wetting said ion exchange membrane to provide ionic conduction between the electrodes, means for directing a stream of internal combustion engine exhaust containing fuel gases in varying concentrations across the opposite surface of one of said electrodes at temperatures up to about 110° C., means for supplying air having a lesser fuel gas concentration to the opposite surface of the other electrode, and means for sensing current flow between said electrodes due to changes in fuel gas concentration in said exhaust stream.

5. A method for detecting relatively low concentrations of fuel gases in an oxidizing atmosphere comprising the steps of interposing an ion exchange membrane that conducts hydrogen ions as a gas diffusion barrier between facing surfaces of identically catalyzed and constructed gas electrodes, flooding said electrodes and wetting said membrane with concentrated phosphoric acid to provide ionic conduction between said electrodes, exposing the opposite surface of one of said electrodes to an oxidizing atmosphere of predetermined composition, exposing the opposite surface of the other electrode to a flow of a similar oxidizing atmosphere containing a greater fuel gas concentration than the first-mentioned atmosphere, continuously flowing said similar oxidizing atmosphere over the opposite surface of said other electrode at a temperature of from about 0° – 110° C., electrically coupling said electrodes and detecting current flow therebetween, and suppressing changes in said current flow due to changes in water content of said phosphoric acid.

6. A method for detecting varying fuel gas concentrations in the exhaust stream of an automobile internal combustion engine which comprises cooling a stream of hot exhaust gases from an internal combustion engine to a temperature of about 25° – 110° C. and to a substantially constant high relative humidity, directing said cooled stream to a detector cell having substantially functionally identical spaced catalytic gas electrodes with facing surfaces, a hydrogen ion exchange membrane as a gas diffusion barrier between said facing electrode surfaces, and concentrated phosphoric acid flooding said electrodes and wetting said membrane to provide ionic conduction between the electrodes, continuously flowing said cooled exhaust stream across an opposite face of one of said electrodes, exposing the opposite surface of the other electrode to air, and continuously electrically monitoring cell current flow between said electrodes.

* * * * *